US010253716B2

(12) United States Patent
Mentele

(10) Patent No.: US 10,253,716 B2
(45) Date of Patent: Apr. 9, 2019

(54) ENGINE ANALYSIS AND DIAGNOSTIC SYSTEM

(71) Applicant: Predictive Fleet Technologies, Inc., Midland, MI (US)

(72) Inventor: James Mentele, Midland, MI (US)

(73) Assignee: Predictive Fleet Technologies, Inc., Midland, MI (US)

( * ) Notice: Subject to any disclaimer, the term of this patent is extended or adjusted under 35 U.S.C. 154(b) by 200 days.

(21) Appl. No.: 14/775,852

(22) PCT Filed: Mar. 14, 2014

(86) PCT No.: PCT/US2014/028273
§ 371 (c)(1),
(2) Date: Sep. 14, 2015

(87) PCT Pub. No.: WO2014/144036
PCT Pub. Date: Sep. 18, 2014

(65) Prior Publication Data
US 2016/0025027 A1    Jan. 28, 2016

Related U.S. Application Data

(60) Provisional application No. 61/791,318, filed on Mar. 15, 2013.

(51) Int. Cl.
*F02D 41/26* (2006.01)
*F02D 41/22* (2006.01)
(Continued)

(52) U.S. Cl.
CPC ............. *F02D 41/26* (2013.01); *F02D 41/22* (2013.01); *F02D 41/2429* (2013.01); *G01M 15/05* (2013.01)

(58) Field of Classification Search
CPC .......... F02D 41/22; F02D 41/24; F02D 41/26; F02D 41/2429; F02D 41/2441;
(Continued)

(56) References Cited

U.S. PATENT DOCUMENTS 5,041,976 A * 8/1991 Marko .................... F02D 41/22
                                                          701/102
7,099,752 B1 * 8/2006 Lenell .................. G05D 1/0027
                                                          244/189

(Continued)

*Primary Examiner* — Erick R Solis
*Assistant Examiner* — Anthony L Bacon
(74) *Attorney, Agent, or Firm* — Fishman Stewart PLLC

(57) ABSTRACT

A system for analyzing an engine of a vehicle may comprise a computer including a computer processor, a sensor connected to a portion of the vehicle and being configured to provide an engine signature to the computer, a simulator module configured to utilize the computer processor to generate simulated signature features associated with a simulated vehicle having prescribed defects, and a self-learning module configured to utilize the computer processor to learn associations between the simulated signature and prescribed defects. The computer processor may be configured to compare the engine signature with the associations of the self-learning module to produce a probability indicator that the engine has the prescribed defect at a specified intensity associated with a diagnosis of the engine.

20 Claims, 11 Drawing Sheets

(51) Int. Cl.
*F02D 41/24* (2006.01)
*G01M 15/05* (2006.01)

(58) Field of Classification Search
CPC ............. F02D 41/2451; F02D 41/2474; F02D 41/2477; F02D 41/248; G01M 15/05; G01M 15/12
See application file for complete search history.

(56) References Cited

U.S. PATENT DOCUMENTS

| | | | | |
|---|---|---|---|---|
| 7,369,932 B2* | 5/2008 | Kim | ................ | F01D 21/00 477/30 |
| 8,036,788 B2* | 10/2011 | Breed | ................ | G07C 5/0808 701/31.9 |
| 9,014,918 B2* | 4/2015 | Hagen | ................ | G07C 5/008 701/117 |
| 2002/0029136 A1* | 3/2002 | Hagiwara | ............. | G01M 13/02 703/8 |
| 2002/0150866 A1* | 10/2002 | Perry | ................ | F41G 7/006 434/62 |
| 2002/0161495 A1* | 10/2002 | Yamaki | ................ | G01M 15/05 701/33.8 |
| 2004/0002843 A1* | 1/2004 | Robarts | ................ | A63F 13/10 703/13 |
| 2004/0098190 A1* | 5/2004 | Nakayama | .......... | F02D 41/1403 701/104 |
| 2004/0254696 A1* | 12/2004 | Foerstner | ................ | B60T 8/885 701/31.7 |
| 2007/0283188 A1* | 12/2007 | Balzer | ............... | B60W 50/0205 714/26 |
| 2010/0168989 A1* | 7/2010 | Gao | ................ | F02D 41/2422 701/110 |
| 2011/0131026 A1* | 6/2011 | Sizov | ................ | G09B 9/042 703/8 |

* cited by examiner

| NumCyl | 6 | GM's 3800 engine is a 3.8 liter V-6 used in many models, like the Bonneville, LeSabre, and Grand Prix. | | | | | | |
|---|---|---|---|---|---|---|---|---|
| Mode | idle | | | | | | | |
| | CompressionRatio (new): | | 9.8 | atm | | Front | | Ex1 = dual exhaust |
| | Max Ignition Pressure | | 62 | atm | | 1 | 3 | 5 | Ex = Total Exhaust |
| | ° per Radian | | 57.29578 | | | | | | Ex2 = dual exhaust |
| | Radians per degree | | 0.017453 | | | 2 | 4 | 6 | |
| | Exhaust Valve restriction (Bfex) | | 0.25 | | | | | | |
| | Intake valve restriction (Bfin) | | 0.05 | | | | | | |
| | | | | | | Physical cylinder | | | |
| FireSeq | 1 | 6 | 5 | 3 | 4 | 2 | | | |
| α rings | 0.97 | 0.97 | 0.77 | 0.97 | 0.97 | 0.97 | (1−αrings)*f(t) added to crankcase at t+(FireSeq(i))*720/NumCyl and multiply exhaust by α at t+(FireSeq(i))*720/NumCyl + 180 |
| α-in valves | 0.96 | 0.96 | 0.96 | 0.96 | 0.96 | 0.96 | (1−α_in)*f(t) added to intake at t+(FireSeq(i))*720/NumCyl + (δ-in) and multiply exhaust by α at t+(FireSeq(i))*720/NumCyl + 180 |
| δ-in (°) valve timing | −7 | 2 | 0 | 0 | 0 | 0 | intake cam offset and valve lash timing offset from top-dead-center |
| α-ex valves | 0.96 | 0.98 | 0.96 | 0.96 | 0.96 | 0.96 | (1−α_ex)*f(t) added to Exhaust at t+(FireSeq(i))*720/NumCyl + (δ-ex) and multiply exhaust by α at t+(FireSeq(i))*720/NumCyl + |
| δ-ex (°) valve timing | 0 | 0 | −2 | 6 | −4 | 0 | exhaust cam offset and valve lash timing offset from bottom-dead-center |
| α gaskets | 0.99 | 0.99 | 0.99 | 0.99 | 0.99 | 0.99 | multiply exhaust by α_g at t+(FireSeq(i))*720/NumCyl + 180 |
| α fuel | 0.94 | 0.94 | 0.94 | 0.94 | 0.94 | 0.94 | multiply fuel line p(t) by α_f at t+(FireSeq(i))*720/NumCyl − 180 (need fuel pulse biased to end of period prior to firing?) |

FIG. 8

ENGINE ANALYSIS AND DIAGNOSTIC SYSTEM

CROSS-REFERENCE TO RELATED APPLICATIONS

This application claims priority to International Patent Application No. PCT/US2014/028273 filed Mar. 14, 2014, which is based on and claims priority to U.S. Provisional Patent Application No. 61/791,318 filed Mar. 15, 2013, the contents of which are hereby incorporated in their entirety.

FIELD OF TECHNOLOGY

A system and method for analyzing engine signatures, and more particularly, a computer based system, tool and method for simultaneously analyzing one or more engine signatures using one or more sensors to provide an engine assessment including diagnostic and analysis information.

BACKGROUND

Traditionally a mechanic makes decisions during the vehicle repair process by connecting a computer to the electronic control module (ECM) of the vehicle. This may allow the mechanic to download a limited set of data about a vehicle. Often the output of the download contains onboard diagnostic codes (OBD), which the mechanic then relies on to conduct the diagnostic part of the analysis and subsequent proposal for repair. Sometimes this process is unreliable and can even cause unnecessary repairs to be made because the ECM may produce faulty information. An objective of the ECM may be to keep the engine running and, to the extent possible, optimize the performance of the engine. As such, the ECM may not inquire about the physical integrity of the components, because the ECM may not be capable of initiating repair of the components (e.g., clean valves, change rings or pistons, replace a head gasket, clean or replace injectors, change valve lash, etc.).

To address the problem of lack of physical integrity information, it may be recognized that operating (e.g., moving) parts often produce vibrations and pressure pulses. Any reciprocating engine may have a well-defined cycle that should repeat, quite precisely, during each cycle. Internal combustion engines may include a set of cylinders that are designed to be identical to promote optimal engine operation. Wear, deterioration, and defects may cause variation in the pulse and vibration patterns from the various components. It may be beneficial to capture these signatures periodically over the life of the engine to monitor loss of physical integrity.

The traditional vehicle repair process does not track historical information about the operating conditions of a vehicle. In a fleet environment, tracking information about how a particular vehicle has been performing may be even more difficult. For example, if a valve is stuck on a truck in a fleet, or if a piston is cracked, or if components such as head gaskets or rings are just undergoing slow deterioration, and thus the vehicle is performing progressively more poorly, the fleet owner has limited data points or other information about that particular vehicle and thus the problem may go unnoticed. Such physical integrity issues may not trigger an error code. Perhaps the vehicle is progressively getting diminishing fuel mileage unbeknownst to the owner. In such circumstances the vehicle may not get timely repairs which could lead to more severe problems, and expenses. It would be desirable to provide fleet owners with a dynamic engine assessment, diagnostic and analysis system that could be provided to fleet owners, not only for one particular vehicle, but continually for every vehicle in the fleet. In addition, the fleet owner may benefit from a predictive analysis capability to predict the mean time to failure of critical components in each engine, allowing the fleet manager to prioritize actions to mitigate the risks.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 8 illustrates a graphical representation of an exemplary screenshot of simulation controls;

DETAILED DESCRIPTION

An exemplary engine analysis and diagnosis tool may include a sensor for capturing engine signatures of a vehicle. An engine signature may include a series of pressure pulses, including vibrations, plotted relative to time for particular regions of the engine. For example, engine signatures may include vibration information from a crankcase of a particular vehicle via a crankcase access port, which may be superimposed over lower frequency pulses from defects in a cylinder of the engine. The engine signatures may be interpreted by an algorithm which provides diagnostic information to the system and ultimately to a user such as a mechanic, vehicle technician, vehicle owner, or driver. The sensors may be used to capture engine signatures in other locations such as, but not limited to, the tail pipe, fuel injector, or intake manifold. The system may diagnose an engine by comparing the engine signatures of a particular engine to simulated signatures of benchmark engine having a similar engine type at similar operating conditions. Although engine signatures may be described with respect to exemplary embodiments, it is contemplated that the systems, tools, and methods of this disclosure may be utilized with respect to any portion of a vehicle.

Another exemplary embodiment provides an engine analysis and diagnosis tool that may be used in a garage by a user such as a mechanic or vehicle technician. The engine signatures may be captured into a diagnostic report that may reveal integrity information of the particular engine. Such task could quickly tell the current mechanical state of the engine.

Another embodiment provides a system for fleet owners to capture engine signatures at various locations of a particular engine, transmit those engine signatures to a server, and process them to provide a diagnostic report. Telemetry may be used to automatically send diagnostic reports for a fleet of vehicles to a central location such as fleet headquarters.

Another embodiment provides an engine analysis and diagnosis system that may include a database of offset tables that may store historical data about the engine characteristics including engine signatures, engine firing sequence data, and other data. This database may dynamically integrate new vehicles and engine models over time.

Figure 1:
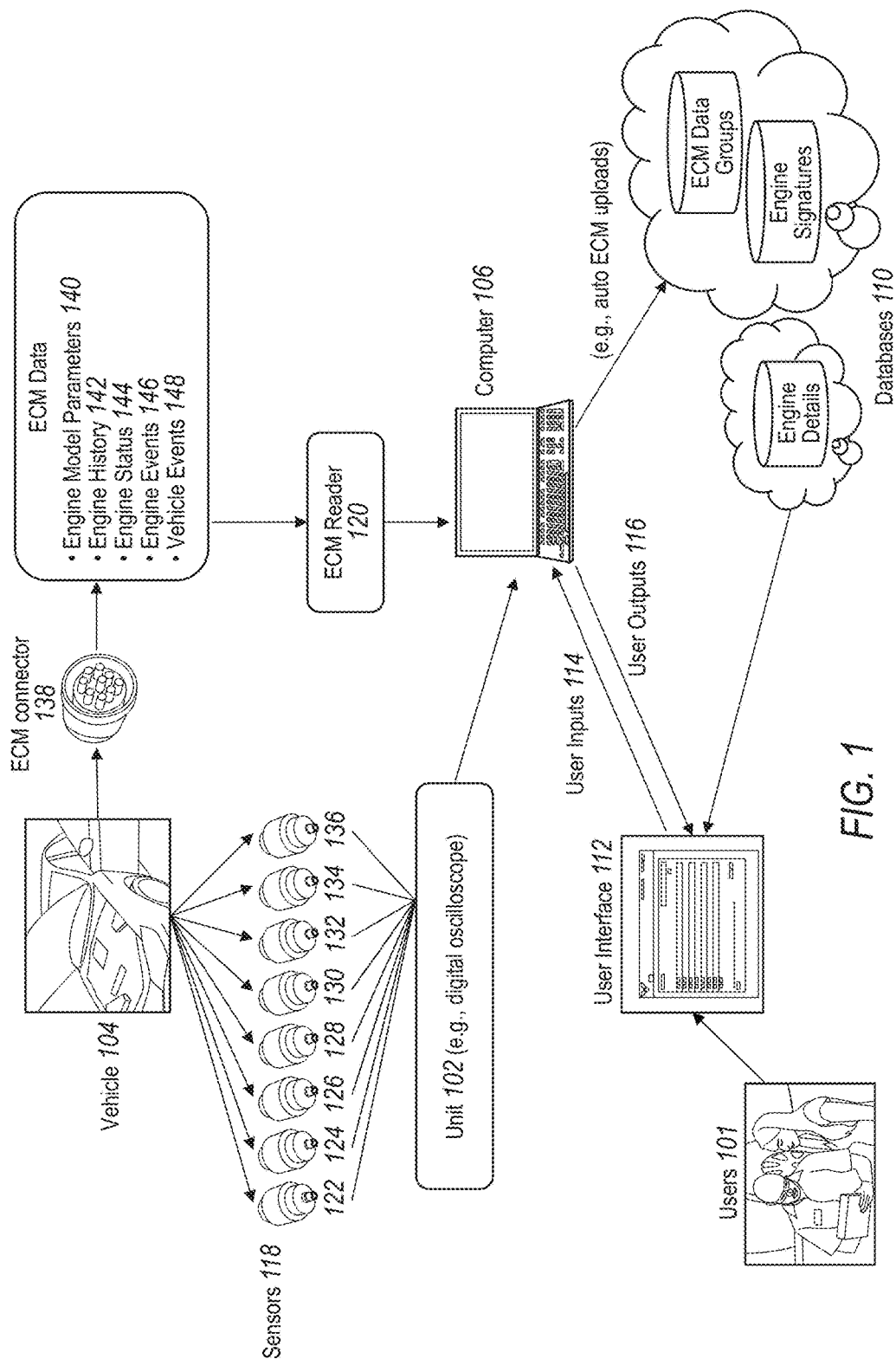
FIG. 1 illustrates a schematic diagram of the engine analysis and data collection system.

FIG. 1 illustrates an exemplary engine data collection system 100. System 100 may be used by users 101 (e.g., an owner of a fleet of vehicles) to help manage the quality and care of one or more vehicles 104. The system 100 may include unit 102 (e.g., a digital oscilloscope), vehicle 104, computer 106, databases 110, user interface 112, sensors 118, and ECM reader 120. Computer 106 may be communicatively connected to unit 102, databases 110, user interface 112, and ECM reader 120.

Computer 106 may include a standalone computer station, tablet computer, or cloud computing interface. Computer 106 may include a computer processor configured to run software, for example customer program 200 and self-learning program 300 as discussed below. Computer 106 may be configured to interface with and transfer vehicle information between vehicle 104, databases 110, and user interfaces 112. Computer 106 may be configured receive the user inputs 114 from and provide user outputs 116 to user interface 112. User interface 112 may prompt user 101 for user input 114, for example vehicle characteristics such a number of cylinders or stroke (e.g., 2 or 4 stroke) of the engine. User interface 112 may display outputs 116, for example engine signatures of vehicle 104. Unit 102, computer 106, vehicle 104, databases 110, user interface 112, sensors 118, and ECM reader 120 may be communicatively connected with wired or wireless connections.

Databases 110 may provide engine information of vehicle 104 to user interface 112 and may receive ECM information and sensor information (e.g., engine signatures) of vehicle 104 from computer 106. Databases 110 may be on a server or a cloud. Engine details may include the number of cylinders, v or straight configuration, 2 or 4 stroke, manufacturer, and engine model. The ECM information may be received from ECM reader 120 connected to ECM connector 138 of vehicle 104. The sensor information may be received from unit 102 connected to sensors 118.

Unit 102 may be connected to vehicle 104 with sensors 118. Sensors 118 may have a wired or wireless connection to unit 102 and vehicle 104. Sensors 118 may be connected to components of vehicle 104 to provide sensor information (e.g., engine signatures) to unit 102 and to computer 106. Sensors 118 may include an exhaust sensor 122 (e.g., with respect to an exhaust pipe), intake sensor 124 (e.g., with respect to an intake manifold), crankcase sensor 126 (e.g., with respect to any crankcase access port such as an oil dipstick tube or oil filler tube), fuel sensor 128 (e.g., with respect to a fuel pressure regulator), ignition sensor 130 (e.g., with respect to a voltage of one or more spark plugs), cooling system sensor 132 (e.g., with respect to a coolant pressure in a radiator), brake sensor 134 (e.g., with respect to brake lines, calipers, or pads), fuel pump sensor 136 (e.g., with respect to fuel line), and sensors associated with any other portion of vehicle 104. For example, if the vehicle 104 has six cylinders, sensors 118 may be provided to receive data from various portions of vehicle 104, such as from the exhaust pipe, crankcase access port, intake manifold, fuel pressure regulator, voltage at one or more spark plugs (e.g., spark plug one), and coolant pressure in radiator. The sensors 118 may operate in parallel and may simultaneously collect data at various degrees of rotation of a crankshaft of vehicle 104. The sensor information may be transmitted from unit 102 to computer 106 for processing.

ECM reader 120 may be connected to vehicle 104 with ECM connector 138 or wirelessly to provide ECM information to computer 106. ECM reader 120 may receive ECM information from engine model parameters module 140 (e.g., serial numbers and other vehicle information from the manufacturer), engine history module 142 (e.g., a crankshaft rotations since production, and hours running since engine production), engine status module 144 (e.g., running temperature, fuel economy, number of crankcase rotations, volume of fuel used, running hours, and engine OBD codes triggered), engine events module 146 (e.g., if the engine RPM exceeded an RPM threshold such as 2,500 RPMs), vehicle events module 148 (e.g., if the vehicle experienced hard braking or exceeded a speed threshold such as over 80 miles per hour), and other vehicle information.

Figure 2:
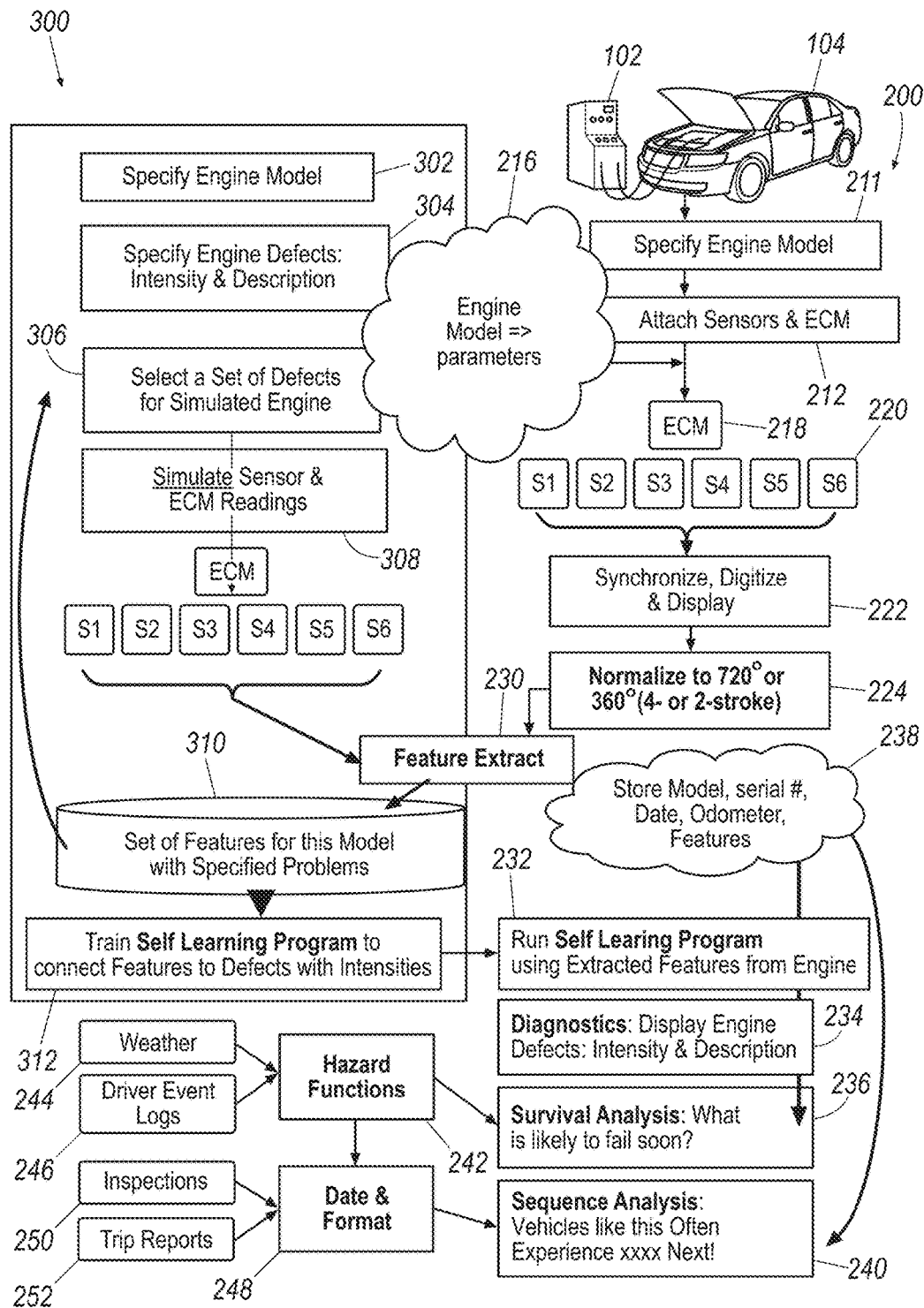
FIG. 2 illustrates an exemplary process flow for the system of the present disclosure.

FIG. 2 illustrates exemplary customer program 200 and self-learning program 300. Programs 200 and 300 may be executed by computer 106. Program 200 may record engine signatures using sensors 118 and receive vehicle information from ECM reader 120. Program 300 may act as a self-learning tool that may generate simulated signatures from the engine details on database 110 along with engine signatures obtained from a similar vehicle 104 with a set of known or prescribed defects. Program 300, using the computer processor of computer 106, may learn associations between an engine signature of a particular vehicle 104 and the set of prescribed defects of an engine model similar to vehicle 104. Computer 106 may compare the engine signature with the associations of self-learning module 300 to generate a probability indicator (e.g., a visual indicator or statistical probability) that the particular engine of vehicle 104 may have the prescribed defect along with a specified intensity associated with a diagnosis of the engine. Thus, programs 200 and 300 may allow a user to diagnose an engine without waiting for all failure combinations to occur.

The program 200 may include a specify engine module 211 (e.g., engine model parameters), attach sensors and ECM module 212, receive engine model parameters from database module 216 (e.g. from database 110), extract ECM data module 218, extract sensor data module 220, synchronization module 222 (e.g., synchronize, digitize, and display), normalization module 224 (e.g., to 720 or 360 degrees based on 2 or 4 strokes, engine condition such as running or cold-crank, and engine speed such as 300, 750, or 1500 RPM), feature extract module 230 (e.g., to extract to program 300), store vehicle parameters module 238 (e.g., to store model number, serial number, date, odometer reading, and vehicle features on database 110), run self-learning program module 232 (e.g., using extracted features from the engine signature), diagnostics module 234 (e.g., display engine defects including intensity and description), survival analysis module 236 (e.g., to determine what is likely to fail soon), and sequence analysis module 240 (e.g., to determine what similar vehicles often experience next). Survival analysis 236 may include hazard functions module 242 to incorporate weather conditions 244 and driver event logs 246. Sequence analysis 240 may perform date and format module 248 including inspections 250 and trip reports 252.

The program 300 may be configured to generate simulated signatures of any portion of vehicle 104, for example either or both of an exhaust and crankcase. The program 300 may be configured to account for characteristics of various portions of vehicle 104 and account for various vehicle (e.g., engine) conditions, for example the rotational velocity (e.g., RPM) of the crankshaft may change according to a pressure change of each cylinder between the power stroke and compression stroke. The program 300 may be configured to generate a family of simulated signatures for a particular engine model (e.g., similar to vehicle 104) having various prescribed defects and associated severities. The program 300 may generate on database 110 a training dataset of simulated signatures and associated prescribed defects. The program 300 may include a specify engine module 302 (e.g., engine model or parameters), specify engine defects module 304 (e.g., intensity and description), defect selection module 306 (e.g., select a set of defects for simulated engine), simulator module 308 (e.g. sensor and ECM readings), feature extract module 230 (e.g. to extract from program 200), generate feature set module 310 (e.g., for a particular model with prescribed defects similar to vehicle 104), and train self-learning program module 312 (e.g., to associate features of vehicle 104 to prescribed defects with intensities). Software of simulator module 308 or a user may perform feature extract module 230 to provide features and diagnostics (e.g., engine signatures) of vehicle 104 into the training dataset on database 110. The program 300 may be performed periodically (e.g., annually) or continuously to account for a drift in environmental conditions, for example changes in fuel composition, ambient temperature, humidity, or other environmental characteristics that may affect engine combustion. This program 300 may allow system 100 to get smarter as it learns associations between vehicles 104 and prescribed defects.

With further reference to program 200 of FIG. 2, specify engine module 211, attach sensors and ECM module 212, receive engine parameters from cloud module 216, and extract ECM data module 218 may be performed to obtain vehicle information of vehicle 104, for example, including the number of cylinders and strokes (e.g., 2 or 4), vehicle identification, rotations per minute (RPM) based on the tachometer, and other vehicle parameters of vehicle 104.

Extract sensor data module 220 may extract the sensor information of sensors 118. The quality of each engine signature may be filtered to ensure it adequate for reliable analysis. Each engine signature may include the harmonic motion according to corresponding voltages for a particular channel associated with each sensor 118, which may be displayed to output 116 or unit 102. For example, sensors 118 may include exhaust sensor 122 (e.g., in the exhaust pipe) and crankcase sensor 126 (e.g., in the crankcase access port). Additional sensor 118 locations may include an intake manifold, cylinder one signal, fuel pressure regulator, and any other portion of vehicle 104.

The synchronization module 222 may include downloading the engine signatures into a data table or spreadsheet on database 110 and organizing the engine signatures by cylinder. The synchronization module 222 may organize the engine signatures (e.g., vibration signatures) to facilitate analysis. For example, after extract data module 218 extracts a voltage range from each cylinder via the crankcase through a crankcase port reading, synchronization module 222 may shift the crankcase readings of the engine signature to align the cylinder crankcase data with the same cylinder exhaust data. Synchronization module 222 may perform this based on whether the engine is 2- or 4-stroke engine or whether the engine running under its own power or according to a cold-crank signature. The range of the voltage ranges over the cylinders and the magnitude of voltage produce a lower-engine integrity measure indicating the condition of the rings, piston, and cylinder walls.

Figure 3:
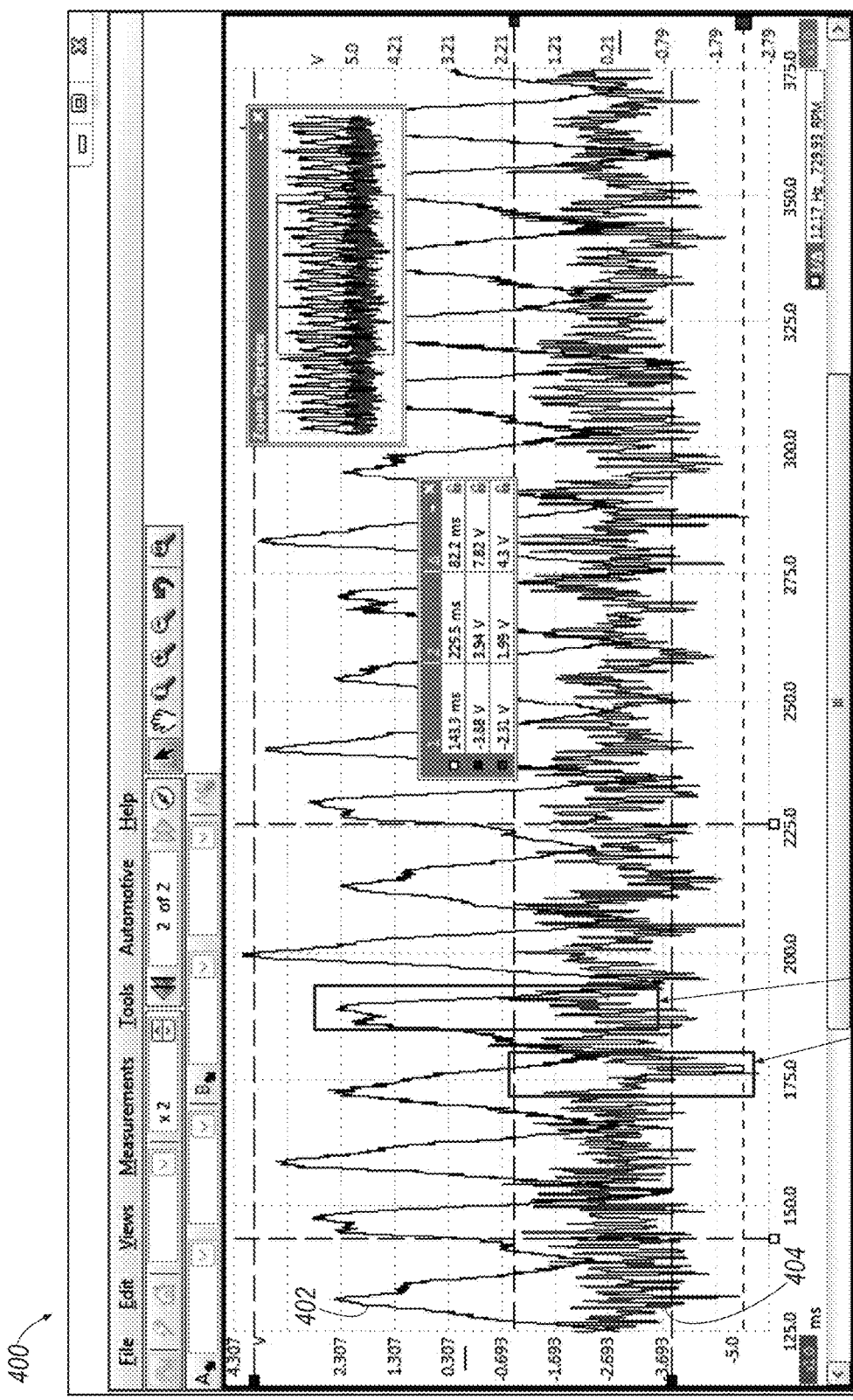
FIG. 3 illustrates a graphical representation of an exemplary screenshot, for example, showing exhaust and crankcase engine signatures.

FIG. 3 illustrates a graphical representation of an exemplary screenshot 400 of output 116 in advance of normalization module 224 of program 200. The normalization module 224 may convert the data points of the engine signature from time of data capture to degrees of crankshaft rotation for vehicle 104. The engine signature may be scanned to locate a uniform RPM window, for example, covering at least two rotations of the crankcase for 4-stroke engines or at least one rotation for 2-stroke engines. Window 426 may include an exhaust signature 402 of vehicle 104 and window 428 may include a crankcase signature 404 of vehicle 104, both of which may be with respect to the same cylinder. The normalization module 224 may extract an exhaust time duration and voltage variation for each cylinder of the engine. These values may be normalized to engine RPM (e.g., an engine running at 1500 rpm). The engine RPM may also be obtained by sensors 118 or ECM reader 120 or reported to database 110. The program 200 may then generate an upper-engine integrity that may summarize a range of cylinder parameters from the exhaust signature of vehicle 104, which may indicate a condition of the injectors, combustion chambers, head gasket, and valves. The program 200 may then calculate a Fourier transform to indicate a severity of each engine feature (e.g., cam setting or valve lash adjustment required and blow-by or valve leakage due to dirty valves or valves not seated) and an intensity of each engine feature.

With further reference to FIG. 3, the engine signatures for a 6-cylinder 4-stroke engine of exemplary vehicle 104 are plotted. The engine signatures may include exhaust signature 402 and crankcase signature 404. The cylinder numbers may be matched to firing sequence or cylinder position (not shown). The engine signatures may reflect, for example, increased vibration in a crankcase of vehicle 104 during a power stroke preceding a weak exhaust stroke. In this case, the engine exhaust signature 402 may indicate blow-by including fuel, air, combustion products, and moisture being prematurely forced past the rings into the crankcase during a power stroke, which may be due to improper or delayed seating of the rings of vehicle 104. The engine signatures may be interpreted by a user (e.g., mechanic) or by an algorithm of a software program, for example, to analyze and report an integrity of each cylinder of the engine of vehicle 104. Exhaust signature 402 may include peaks having magnitudes indicating a primary pulse in the exhaust from each cylinder, in firing order sequence. By considering the time duration that covers all cylinders firing once in the associated time period, the RPM of the engine may be derived. This may depend on whether the engine is 2- or 4-stroke, for example 4-stroke engines have two revolutions of the crankcase per 4-stroke cycle while 2-stroke engines have one revolution per 2-stroke cycle.

Figure 4:
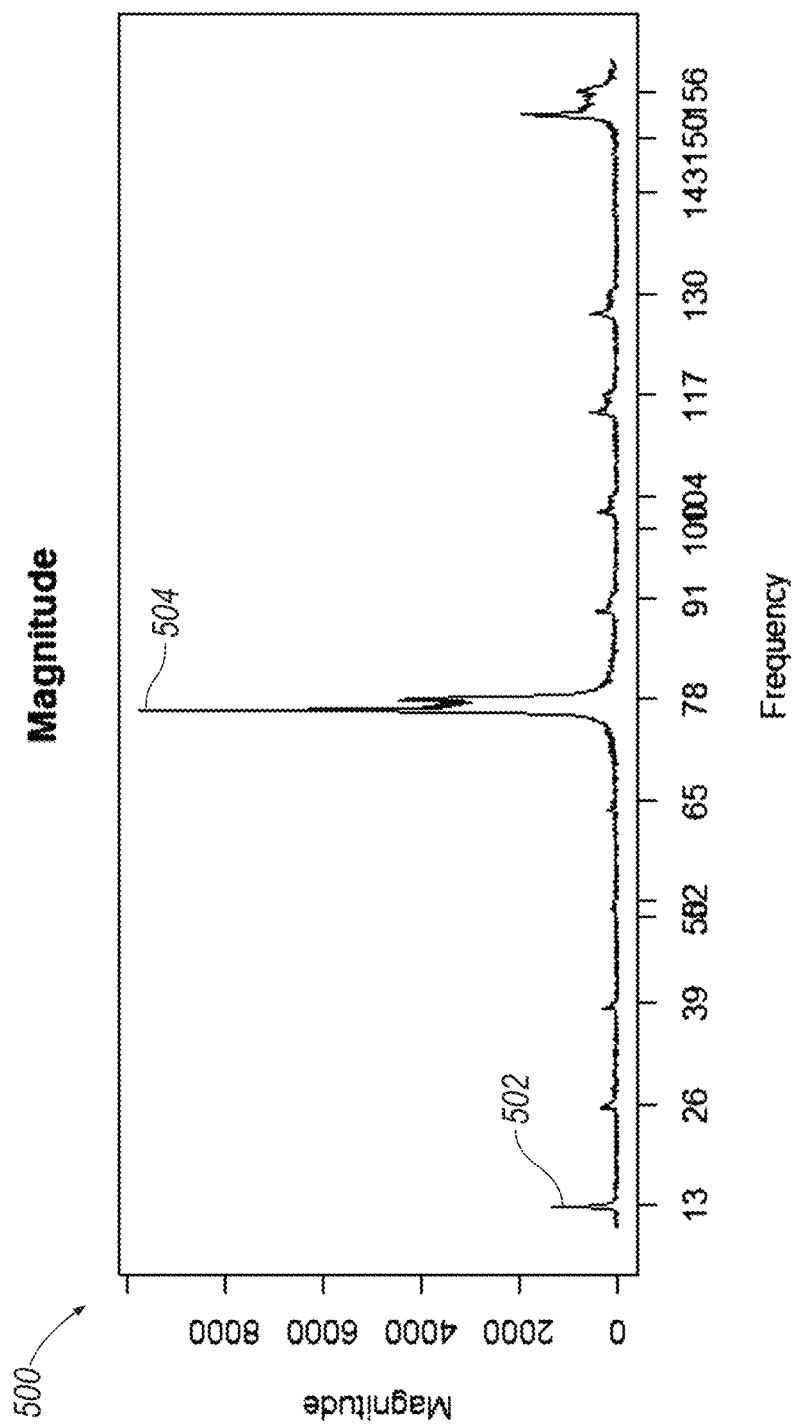
FIG. 4 illustrates a graphical representation of a frequency domain spectrum of an exhaust signature, for example, showing a frequency of piston cycles and complete 4-stroke cycles.

Referring to FIG. 4, a Fourier transform may be used to transform the information of a reciprocating process from a time domain to a frequency domain. The Fourier transform of an exhaust signature 502 may produce a plot that shows the relative magnitude of the number of peaks at different frequencies. For a reciprocating engine, the lowest common frequency 502 may occur once for each engine cycle. At N number of cylinders multiplied by the frequency of the engine cycle, a peak 504 may represent the frequency of each cylinder firing. If the engine is operating well, these peaks may appear to be close to or on top of each other, otherwise the peaks may be more spread apart. In general, it may be desirable for an original engine signature being processed to have equal time steps to facilitate transformation to a frequency-based signature (e.g., using a Fourier transform). Any of a variety of curve-fitting software processes (e.g., Splines or LOESS) may be used to impute the voltages over the interval in equal time-steps. A smoothed signature may be scanned to find voltages crossing zero voltage. Extrapolation between the neighboring values may approximate a time having zero voltage. By scanning through the engine signature, cylinder boundaries may be identified and the time duration and voltage range may be obtained for each cylinder exhaust stroke. These cylinder values may be combined to produce cylinder averages and variances for each cylinder in firing order sequence. Cylinder durations may average the time of a cycle divided by the number of cylinders and represents an angle of 720 degrees divided by the number of cycles. If one cylinder is noticeable, the peak at the lowest frequency will be enhanced, because each cylinder fires once per engine cycle.

With respect to crankcase signature when the engine is running, a condition of rings, pistons, and cylinders of an engine may be most visible during each cylinder's power stroke. An exhaust stroke of a particular cylinder may lag the power stroke by about 180 degrees. If the crankcase is rotated by a starter without fuel, referred to as a coldcrank condition, the compression stroke for the same cylinder as indicated with the exhaust signature 404 may be 360° before or after the exhaust stroke. The crankcase signature 404 may have a peak at the same frequency as the exhaust signature for the engine exhaust cycle for each cylinder. If there is no noteworthy low frequency peak, the oscillations of the engine signature may not be related to a specific cylinder, which may indicate that the lower engine components of the engine are in good shape. If there is all noise and no signal (e.g., no repeating cycle), the engine signature may indicate that no cylinder is exceptional.

Figure 5:
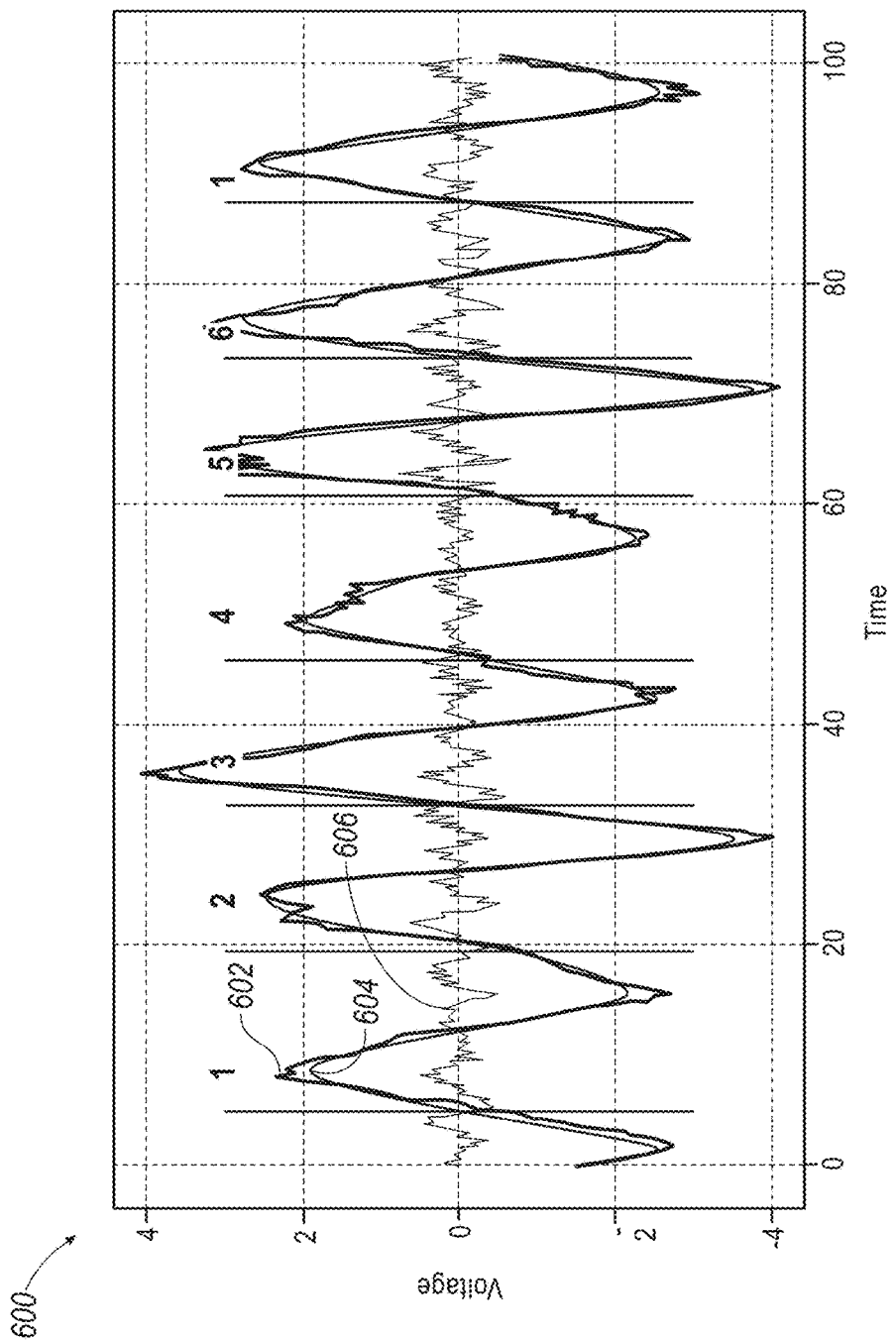
FIG. 5 illustrates a graphical representation of an exemplary screenshot, for example, showing average waveform, smoothed local regression, and difference plots.

FIG. 5 illustrates a graphical representation of an exemplary screenshot 600 of output 116. Plot 602 may include an average waveform of the engine of vehicle 104 over several cycles. Plot 604 may include a smoothed plot of the average waveform, for example, using a curve-fitting routine as mentioned above. Plot 606 may include the difference between items 602 and 604. The lower frequency portions of plot 606, for example, may indicate the need for a valve lash adjustment. The higher frequency portions of plot 606, for example, may indicate that the engine is not warm or the valves are not properly seated due to carbon deposits.

Figure 6:
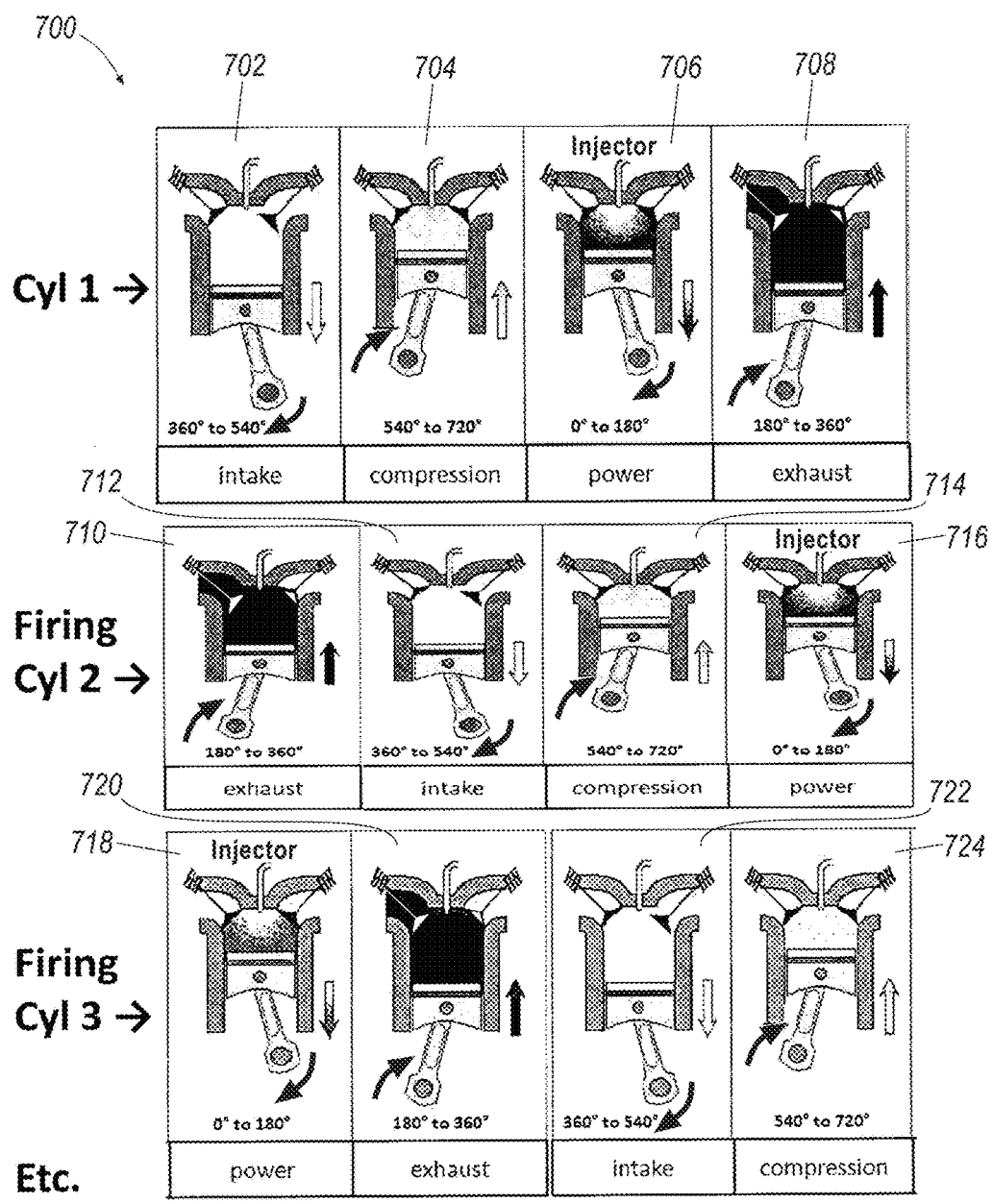
FIG. 6 illustrates an exemplary diagram of a 4-stroke engine firing sequence.

FIG. 6 illustrates exemplary firing sequence diagrams for a four-stroke engine of vehicle 104. For this engine type, each cylinder, numbered according to firing sequence, may have four strokes associated with rotation of the crankshaft. For a four-stroke engine, the simultaneous strokes overlap for different cylinders, thereby making the association between voltage levels and cylinders more complex. This is the reason that the Self-Learning Programs such as neural networks are important to interpret the signatures from the feature extracts described earlier. Exemplary cylinder one may have strokes 702, 704, 706, and 708. Exemplary cylinder two may have strokes 710, 712, 714, and 716. Exemplary cylinder three may have strokes 718, 720, 722, and 724. Any additional number of cylinders may have corresponding strokes. The start (e.g., firing at top of the power stroke) for each cylinder's cycle is offset from the previous cylinder by a number of degrees according to 720 divided by the number of cylinders. For example, a 4 cylinder engine will experience overlapping engine signatures resulting from multiple cylinders of variously timed strokes. In the case of 2-stroke engines, the offset between successive cylinders in firing order is a number of degrees according to 360 divided by the number of cylinders.

With respect to cylinder one, strokes 702, 704, 706, and 708 correspond to respective intake, compression, power, and exhaust stages. At stroke 702, the piston moves downward to draw air in from an intake valve connected to the intake manifold thereby creating a vacuum until the pressure is equalized at the bottom of stroke 702. At stroke 704, the intake valve closes, along with the already closed exhaust valve, as the crankshaft continues to rotate to drive the piston upward to compress the air. At stroke 706, as the piston is near the top of the cylinder, a fuel injector may insert fuel into the cylinder as a spark plug ignites a gas mixture of fuel and air. Alternatively, for a diesel engine, the heat from the compression ignites the injected fuel. At stroke 708, the gas mixture explodes to increase the number of molecules in the cylinder and heat the mixture thereby driving the piston downward. As the piston reaches the bottom of stroke 708, the exhaust value opens to allow the hot gases to escape as the piston is pushed up by the crankshaft to further empty the burnt gases for the next cycle. As cylinder one goes through this cycle, the other cylinders are going through the same sequence, offset by 720 degrees divided by the total number of cylinders. Exhaust sensor 122 may measure a pressure change from the exhaust strokes 708, power stroke 716, and compressions stroke 724, for example due to leakage around valves not tightly seated or compromised gaskets that may be allowing additional gases into the exhaust, which may occur simultaneously. Crankcase sensor 136 may measure the total pressures from all cylinders at any instant thereby detecting blow-by of gas around the pistons that may be increased by leakage from dirty rings, defective pistons, and compromised cylinder walls.

Figure 7:
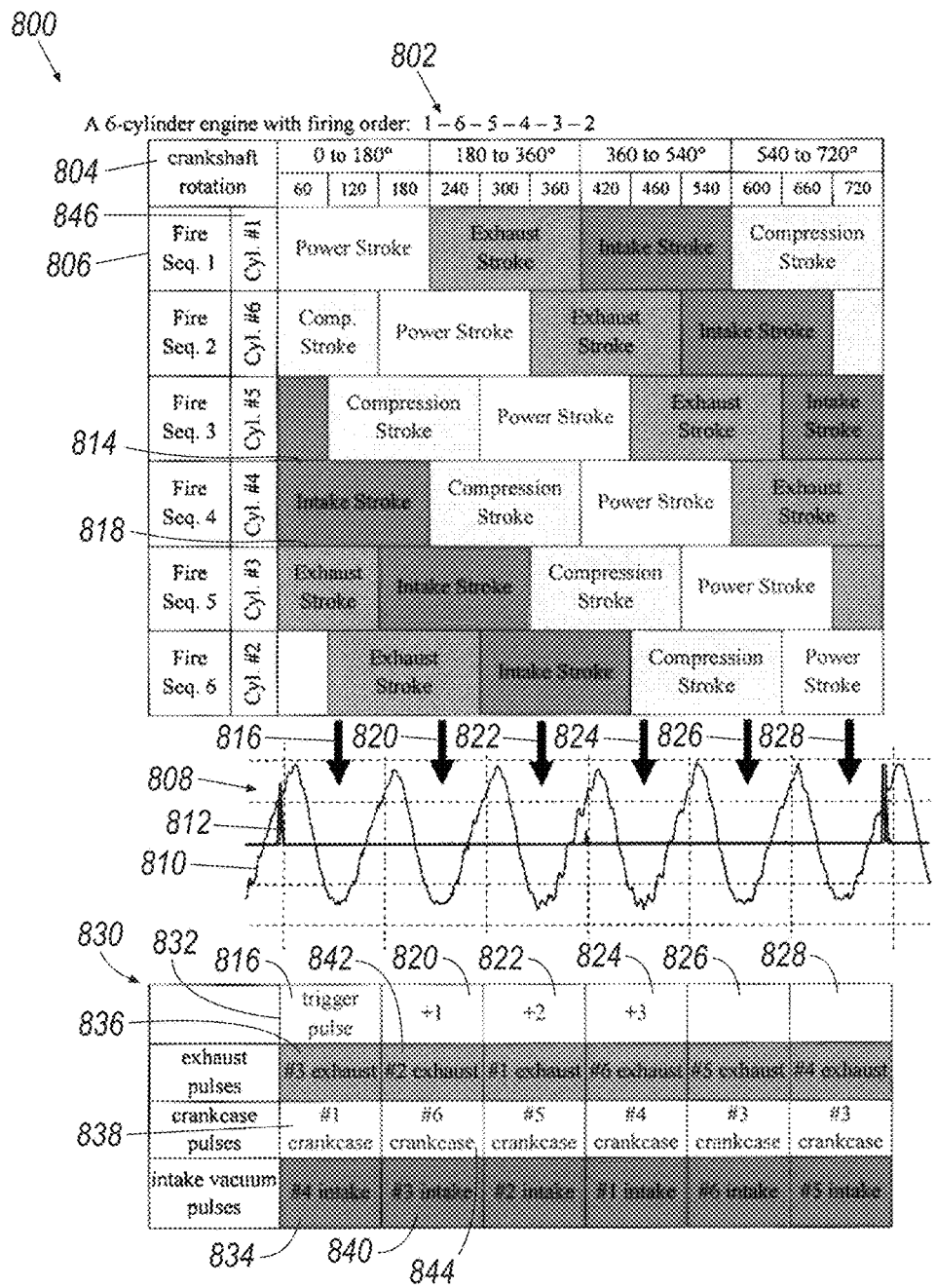
FIG. 7 illustrates an a graphical representation of an exemplary screenshot of a cylinder offset diagram, plot, and chart for a 6-cylinder, 4-stroke engine.

FIG. 7 illustrates a graphical representation of exemplary screenshot 800 of output 116. Screenshot 800 may include engine offset diagrams from synchronization 222 discussed above. Screenshots 800 may include an engine offset diagram 802, plot 808, and chart 830 for an exemplary six-cylinder engine of vehicle 104. Diagram 802 may map a firing sequence versus crankshaft rotation from 0-720 degrees of rotation. Diagram 802 may indicate various strokes (e.g. power, exhaust, intake, and compression) based on crankshaft rotation 804 and firing sequence 806. Plot 808 may indicate an engine signature including an intake vacuum pulse 810 and trigger pulse 812, for example with respect to cylinder one. Plot 808 is with respect to the vacuum side, in contrast to plot 608 with respect to the exhaust side, thereby making the negative peaks or valleys relevant to interpreting these pulse signatures. Chart 830 identifies primary pulse sources identified by physical location 846 of the cylinders as opposed to the firing sequence number 806 based on trigger pulse 832 according to diagram 802 and plot 808. Primary pulse sources may be identified, for example, as exhaust pulses 836, crankcase pulses 838, and intake vacuum pulses 834. The cylinder identifications shown in diagram 802 and chart 830 may be aligned with the firing sequence. An engine with a different firing sequence may change the columns of diagram 802 and chart 830 accordingly.

With further reference to FIG. 7, plot 808 reflects trigger pulse 812 as an intake stroke pulse that may be initiated by cylinder #4. The intake stroke pulse may include a vacuum peak that may be shown as a voltage valley on plot 808. As shown in plot 808, intake vacuum pulse 810 may include effects from pulse 816, pulse 820, pulse 822, pulse 824, pulse 826, and pulse 828. As shown above pulse 816 in area 814 of diagram 802, cylinders #5 and #4, primarily cylinder #4, have an intake stroke associated with pulse 816. Although area 814 indicates an overlap between cylinders #5 and #4 at the start of pulse 816, pulse 816 is primarily cylinder #4. Thus, for the first trigger pulse, the cylinder #4 intake is indicated at area 834 of chart 830 as well as cylinder #3 exhaust at area 836 and cylinder #1 crankcase at area 838 using a similar analysis. As a further example, area 818 of diagram 802 indicates that cylinders #4 and #3, primarily cylinder #3, have an intake stroke associated with pulse 820. Thus, for the second pulse 820, the cylinder #3 intake is indicated at area 840 of chart 830 as well as cylinder #2 exhaust at area 842 and cylinder #6 crankcase at area 844. Accordingly, engine signatures may be utilized to identify problematic cylinders according to the various engine strokes.

With further reference to FIG. 7, defective components may complicate the above analysis. For example, intake pulse 822 has oscillations superimposed over the smooth intake vacuum pressure change from cylinder #2. These may be due to a leaking intake valve in cylinder #3 compression cycle affecting the vacuum. Alternatively, cylinder #6 may have a leaking intake valve affecting intake pulse 822.

The feature extract module 230 is performed after the normalization module 224. The feature extract module 230 may receive engine specifications (e.g., model identification number, serial number, date), engine signatures (e.g., exhaust, crankcase, and intake manifold), and engine state (e.g., cold crank, RPM, mileage, running hours, engine temperature). The feature extract module 230 may fine tune the engine RPM with a fast Fourier transform (FFT) algorithm as mentioned above, average data across cycles and allocate a time duration to each cylinder based on cylinder condition, standardize time for each cylinder and voltage range to 1500 RPM for loading, 750 for idle, and 350 for cold-crank, compare features between cylinders, and output features for each cylinder for each sensor. Any of these functions may be applied to simulated signatures or to standardize engine signatures.

The simulator module 308 may perform an analysis of the engine physics and thermodynamics based on the characteristics of the simulated engine model and the list of prescribed defects and measure of severity of each prescribed defect. The simulator module 308 may receive engine specifications (e.g., the model identification number, number of cylinders, number of valves, and ignition type, configuration, and firing sequence), engine state (e.g., cold crank or running engine), components (e.g., valves, rings, gasket, and injector), and a scope of problems for compromised components (e.g., range of severity for each component problem). The simulator module 308 may calculate pressures at the intake, exhaust, and crankcase, convert the pressures to simulated signatures, extract features including comparing features between cylinders and outputting features for each cylinder for each sensor, and train the self-learning module (e.g., potentially an artificial neural network)

Figure 9:
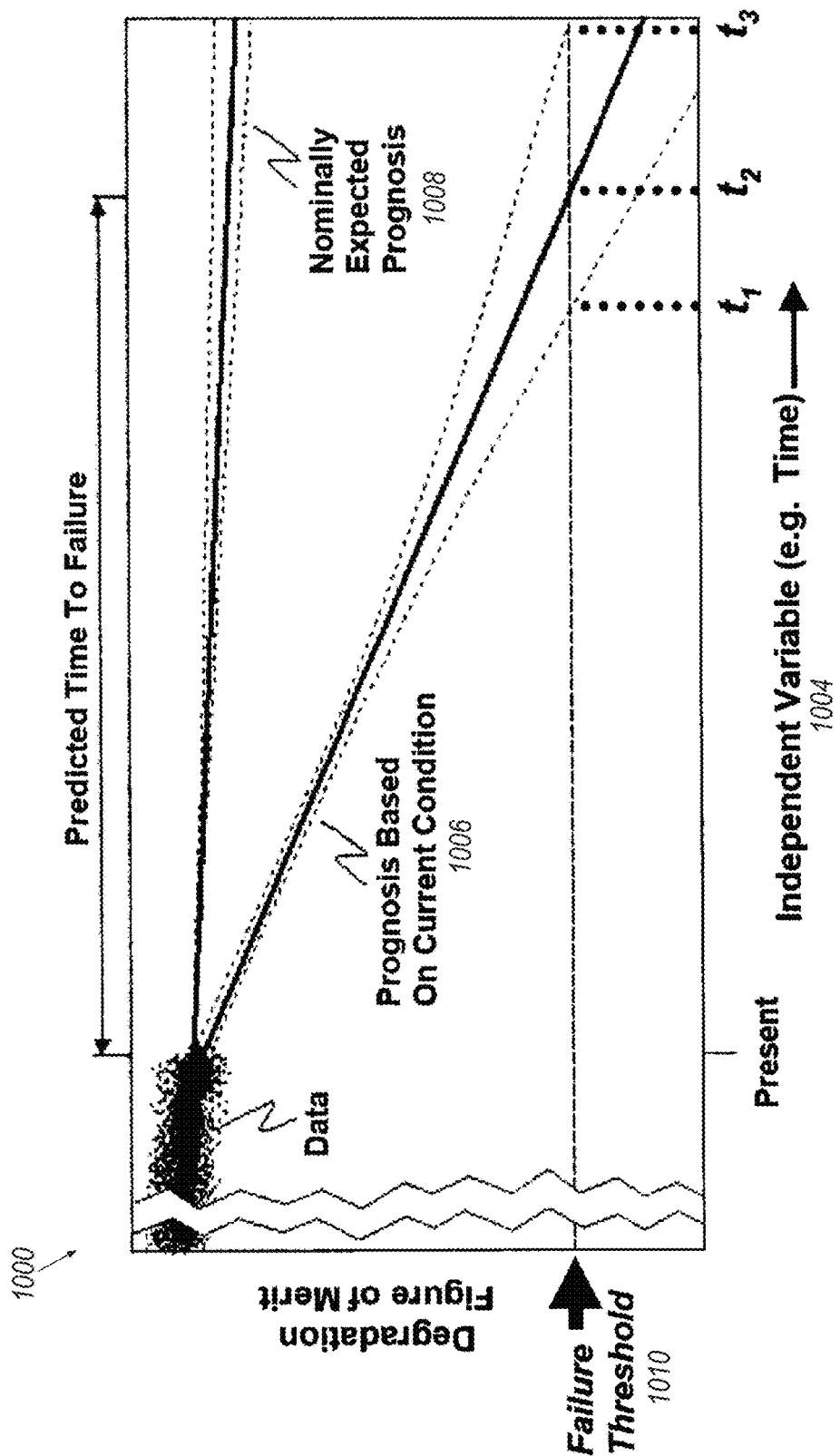
FIG. 9 illustrates a graphical representation of an exemplary screenshot of a graph for a survival analysis module.

FIG. 9 illustrates a graphical representation of simulation controls screenshot 900 for simulator module 308. Simulator module 308 may simulate the pressures for cold-crank with pressure loses due to causes such as leaking valves, gaskets, and rings. Simulator module 308 may receive inputs 114 including a number of cylinders, mode (e.g., idle), compression ratio (e.g., maximum), ignition pressure (e.g., maximum), a conversion of radians per degree, exhaust valve restriction, and intake valve restriction. Simulator module 308 may display outputs 116 according to firing sequence regarding rings, intake valves, intake valve timing, exhaust valves, exhaust valve timing, gaskets, and fuel injectors. Simulator module 308 may simulate the pressures in the various parts of the engine, where sensors 118 (e.g., a pressure sensor) may be located, as a function of angle of rotation of the crankshaft and time. First, simulator module 308 may calculate the pressures as a function of crankcase angle during the 720° rotation of a 4-stroke engine or 360° of rotation for a 2-stroke engine. Then, simulator module 308 may use the pressure in the Power stroke to obtain time (e.g., in milliseconds) for each portion of the cycle (e.g., 720° divided by the number of cycles) normalized to a specified RPM of the engine (e.g., arbitrarily chosen as 1500 RPM as a load condition, 700 RPM for an idle condition, or 350 RPM for a coldcrank condition). Using the dimensions of portions of the engine (e.g., stroke, bore, valve cam timings, etc.), the firing sequence of the cylinders, and the layout of the cylinders, gasket failures may be simulated with respect to the engine block or between two adjacent cylinders. An input table of FIG. 9 has columns for each cylinder in physical layout sequence defined by the manufacturer. The rows of the input table represent degree of failure of various components (the "α" terms) for each cylinder with an a of 1.0 being "perfect." Other factors are "δ" terms indicating angular offsets for critical events.

Train self-learning program module 312 may receive engine information (e.g., model identification number and engine status such as cold crank or running), signature features (e.g., exhaust, crankcase, and intake manifold), and specific problem set (e.g. specified severity for each component problem). Train self-learning program module 312 may include allocate a percentage (e.g., 80 percent) of the problem sets as a training set and the remaining percentage (e.g., 20 percent) as a validation set, initialize a simulated model for a similar engine model or assign model thresholds and weights if a similar engine model is not available, and calculate a severity for each component problem, calculate a measure of all errors for the training and validation sets. If an average error for the training and validation sets is below a predefined minimum threshold, the trained self-learning program module 312 may terminate training. If the average error is above the predefined minimum threshold, the train self-learning program module 312 may adjust the thresholds and weights to minimize training error. Train self-learning program module 312 may store the resulting diagnostic model for the particular engine on database 110.

Store vehicle parameters module 238 may update database 110 with the engine model number, serial number, date, odometers, and engine signature features of vehicle 104. This may be reported as an alert to a maintenance manager or a dispatcher in the event that any engine signature feature indicates engine failure or poor performance in the near future. The engine signature features may be scored by a trained self-learning program 300 to generate probabilities of various diagnostics associated with these engine signature features.

The run self-learning module 232 may be executed by computer 106 to generate a determined problem with vehicle 104 utilizing the analysis of program 300. Computer 106 may process the data of program 300 to produce simulation parameters in response to engine signatures from vehicle 104. The accuracy of the diagnosis will be related to a number of factors, for example, the accuracy of the engine signatures and simulated signatures.

The diagnostics module 234 may perform diagnostic processing with computer 106. The diagnostics module 234 may receive engine specifications (e.g., model identification number, serial number, and date), engine signatures (e.g., exhaust, crankcase, and intake manifold), engine state (e.g., cold crank, RPM, mileage, running hours, and engine temperature), and component threshold (e.g., for each of valve and phase). Diagnostics module 234 may retrieve features for each cylinder for each sensor, retrieve model for a particular engine model, score engine signature features (e.g., from 0 to 1), store all targets with engine state data for survival analysis module 236, and report all targets less than threshold with a designed phrase. Computer 106 may act as a trained artificial neural network (ANN) with backward propagation of errors. Diagnostics module 234 may learn from the prescribed defects on database 110 and associate these prescribed defects with engine signature features of vehicle 104 to project failure modes. The engine signature features may be processed with a score (e.g., 0.0=none; 1.0=excellent) for each component (e.g., ring, valve, gasket, injector, cam timing) in each cylinder according to firing order. Computer 106 may be trained by being exposed to instances of engines with similar features and severity measures associated with various diagnostic statements. The train self-learning program module 312 may derive a probability that a diagnostic statement and a severity exists in the engine exhibiting the signature features extracted from feature extract 230. If the probability predicted from the engine signature features extracted is near 0.0, this may be an indication that the diagnostic statement may not apply to the particular engine. However, if the severity is near 1.0, this may be an indication that the diagnostic statement may apply to the particular engine. The engine specifications may reside on database 110 and may originate from a master database of engine models with number of cylinders, firing sequence, cylinder physical relationships with each other (for head gasket failure modes), etc. The engine signatures may also reside on database 110, which may be populated by with engine signatures collected by mechanics. The engine state may be stored in an index with the engine signature. A list of diagnostic statements and thresholds from mechanics for various defect features may also be stored on database 110. The results of the scoring of the defect features for an engine may produce a list of prescribed defects at a measure of severity for the particular engine with a probability. The results may be stored on database 110 and displayed to output 116.

The survival analysis module 236 may project likely failures from the vehicle information on database 110, which may store how engine signatures of a particular vehicle 104 may have changed over time. A survival analysis module 236 may use database 110 to project when certain failures are likely to occur. The survival analysis module 36 may communicate with database 110, for example, a cloud computing database. The database 110 may store historical results of diagnostics module 234 according to engine serial number. Features extracted in feature extract module 230 may be the input variables used in survival analysis module 236. This survival analysis module 236 may look at the history of engine signatures over time for a particular vehicle 104 and analyze this history to project potential failure modes, for example, based on the experiences of similar vehicles.

The survival analysis module 236 may receive engine specifications (e.g., module identification number and serial number), previous targets (e.g., date, odometer, service hours, and target values for all components in time sequence), and component critical values (e.g., for each component, a value). The survival analysis module 236 may retrieve previously scored targets for each previous diagnosis, fit a line for each component over previous scored targets, project an odometer or hours to when a component is projected to reach a critical value, and report all projections in time sequence, from earliest to latest). The survival analysis module 236 may be configured to analyze the survival of any portion of vehicle 104, for example the engine, tires, brakes, battery, transmission, and turbo charger. Survival analysis module 236 may include hazard functions module 242 that may receive weather conditions 244 and driver event logs 246. The hazard functions module 242 may also receive engine parameters from database 110 including a collection of hazard objects and their associated hazard data. The collection of hazard objects may also include Cox-type factors that work based on number of occurrences and wear factors that depend on mileage or hours of service. The hazard functions module 242 may also receive diagnostics features from diagnostics module 234. The hazard functions module 242 may also include previous targets associated with hazard objects.

Figure 10:
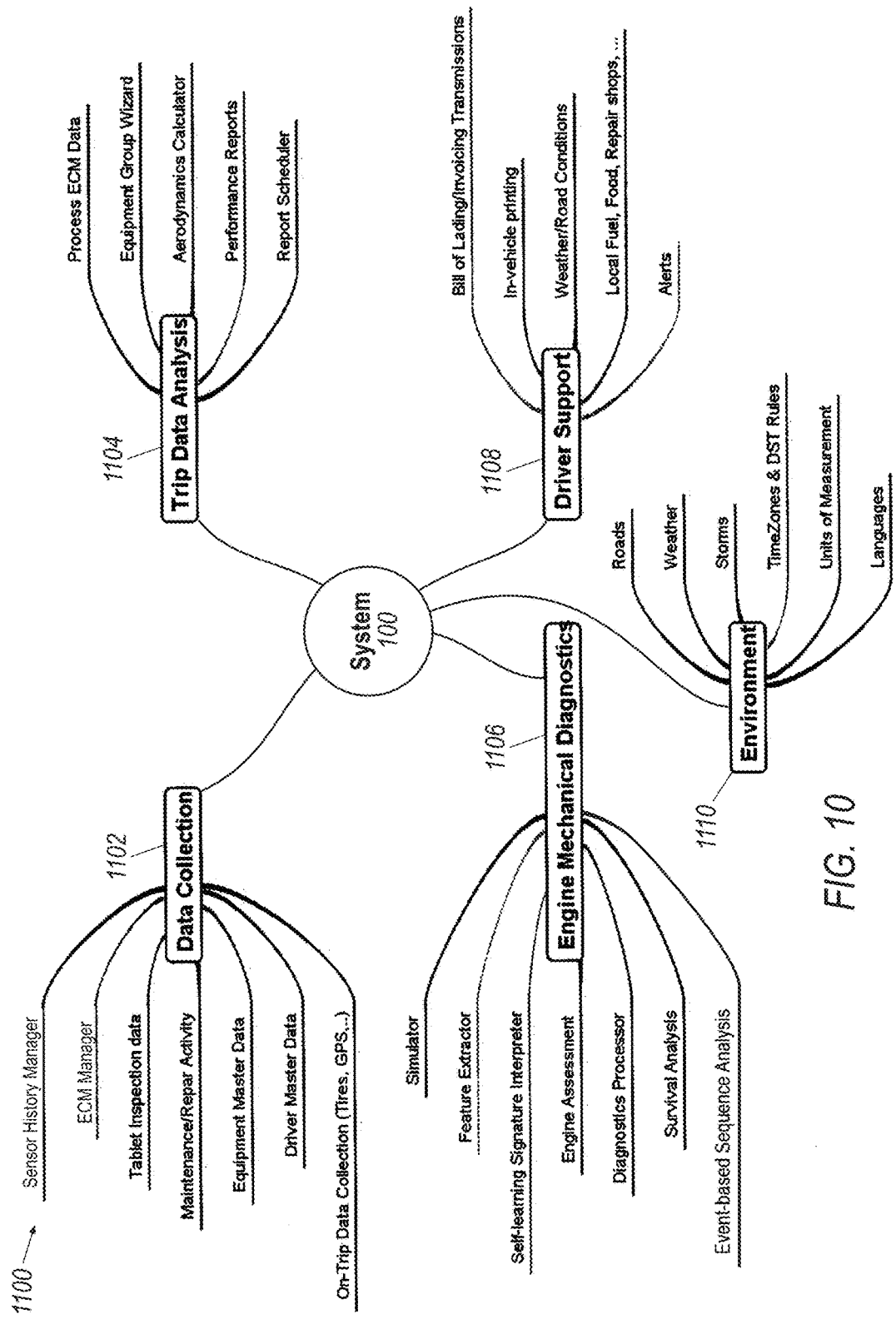
FIG. 10 illustrates an exemplary data architecture of the system.

FIG. 10 illustrates a graphical representation of an exemplary screen shot of plot 1000 indicating degradation figures 1002 versus an independent variable 1004 (e.g., time, or mileage). Plot 1000 may include projected prognosis curve 1006 (e.g., based on current condition of vehicle 104) and expected prognosis curve 1008 (e.g., based on a nominally expected prognosis of a vehicle similar to vehicle 104). Plot 1000 may include threshold 1010 that may indicate the projected failure of vehicle 104. Thus, projected prognosis curve 1006 may cross threshold 1010 at the projected failure according to independent variable 1004 (e.g., indicating a projected failure time or mileage). This prediction of failure tool can be used by fleet owners to predict maintenance or even failure events. The results of the vehicle defects, probabilities, and severity measures may be stored on database 110 for the survival analysis module 240. The survival analysis module 240 may utilize instances of engines that have failed and may also employ various hazard functions (e.g., Cox-type) to capture events that may be suspected of accelerating failures. In addition to engines, the survival analysis module 240 may analyze vehicle objects such as tire failures related to high-speed turns, hard and firm braking, and right turns on urban streets. The horizontal time-series of diagnostics results to provide a history over time (e.g., based on historical driving or utilization) or distance or hours of service until failure of various components.

Figure 11:
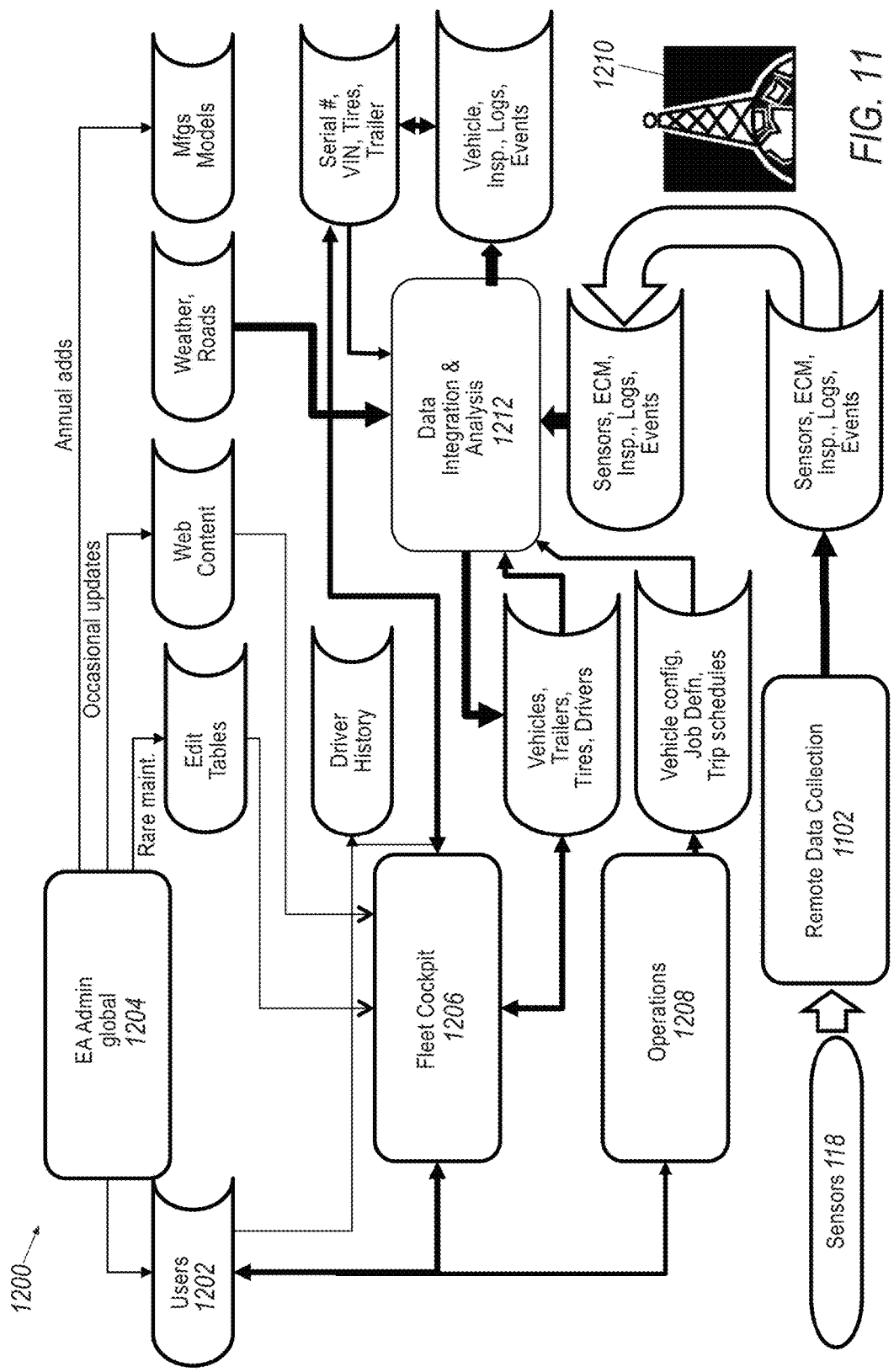
FIG. 11 illustrates an exemplary data flow of the system.

FIG. 11 illustrates an exemplary architecture 1100 for system 100. System 100 may provide data collection 1102, trip data analysis 1104, engine mechanical diagnostics 1106, driver support analysis 1108, and environment analysis 1110. Data collection 1102 may include a sensor history manager (e.g., SenX History Manager or any software configured to store, index, and provide search, retrieval and comparison functions with respect to sensor information), ECM manager (e.g., any software configured to store, index, and provide search, retrieval and comparison functions with respect to ECM information), tablet inspection data, maintenance and repair activity, equipment master data, driver master data, on-trip or trip events collection (e.g., tires and GPS), oil and metals analysis, dynamometer, emissions results, and driver physical and drug results. Trip data analysis 1104 may include process ECM data, equipment group wizard, aerodynamics calculator, performance reports, and report scheduler. Engine mechanical diagnostics 1106 may include simulator module 308, feature extractor module 230, train self-learning program module 312 (e.g., engine signature interpreter), run self-learning program module 232 (e.g., engine assessment), diagnostics processor module 234, survival analysis module 236, and event-based sequence analysis module 240. Driver support analysis 1108 may include bill of lading and invoicing transmissions, in-vehicle printing, weather and road conditions, local fuel, food, and repair shops, and alerts. Environment analysis 1110 may include roads, weather, storms, time zones and daylight savings time (DST) rules, units of measurement, and languages.

FIG. 12 illustrates an exemplary data flow 1200 for system 100. Data integration and analysis 1212 may coordinate data of vehicle 104 between users 1202, global administration functions 1204 (e.g., engine and vehicle manufacturer and model information), fleet cockpit 1206 (input, output, and analytics for the fleet staff), operations 1208 (input, output, and analytics for the fleet operations such as drivers, schedulers, maintenance engineers, shop workers, etc.), and remote data collection 1102 (for sensors 118, ECM 138, etc.). Sensors 118 may send data of vehicle 104 to remote data collection 1102, which may be transmitted through cellular network 1210 for routing to data integration an analysis 1212. Data integration and analysis 1212 may be updated continuously or periodically (e.g., daily) with global administrator information (e.g., tables, web content, weather roads, and vehicle models from manufacturers), user information (e.g., driver history), vehicle information (e.g., serial number, VIN, tires, trailer, vehicle inspections, logs, and events), fleet cockpit information (e.g., vehicles, trailers, tires, and drivers), operations information (e.g., vehicle configurations, job definitions, and trip schedules), and remote data information (e.g., sensor and ECM data, inspections, logs, and events).

The sequence analysis module 240 may be configured to predict vehicle failures by accessing database 110 including a collection of events and periodic test results (signatures, oil sample analysis, inspections) which are a collection of sequences that precede failure events. Sequence analysis module 240 may include event histories collected by vehicles and components (e.g., events considered to be significant failures may be marked) and time durations when events are considered relevant (e.g., events may be deactivated by corrective events such as repairs). Exemplary event histories may include weaknesses documented on inspections (e.g., pre-trip), temperature extremes (e.g., during trips), significant storms, hours of service (HOS) violations or extremes, OBD trouble codes, vehicle speeding, rapid engine shutdown, fast turns, load weight imbalances, late routine maintenance, unperformed repair work requests, and load tire trend. A master table of significant failures may be maintained to control assignments of certain events as failures. A late action (e.g., maintenance) may inactivate an unperformed work request. Market baskets may be created according to vehicle with chronological activity events as causes and terminated by a failure. Sequence analysis module 240 may determine common events that precede each type of failure and generate rules with statistical strengths, for example sequences resulting in failure versus the same sequence that does not result in failure for other vehicles. Periodically or continually, the activity events per vehicle 104 may be compared to the generated rules, thereby resulting in probabilities for failure in the future. Additionally, alerts and reports are presented according to the type of failure.

The sequence analysis module 240 may be configured to statistically identify, based on a listing of event precursors that have led to failures in comparable vehicles, a set of candidate events that may lead to failure of vehicle 104. Using the generated rules, the sequence analysis module 240 may monitor sequences for vehicles at a time in the future to give warnings that current conditions may indicate a near future catastrophic event thereby functioning as an early warning system. The sequence analysis module 240 may perform market basket analyses with time stamps. Thus, any type of event can be studied relative to preceding events, looking for event precursors at derived probabilities to predict many different types of failures or successes. As an example, ECM trip reports may show the two minutes around engine shutdown by second to indicate if the engine was allowed any cool-down after stopping, potentially resulting in a turbo-charger failure on a hot day. As another example, crashes might be more probable with drivers who speed or have worn tires and brakes. The system analysis module 240 may further indicate when driver licenses are about to expire, tire tread depth, pressure, and blowout risk, brake pad thickness, battery failure based on temperature extremes and deep cycle re-charges, fuel run out time/ location based on engine, load, terrain, head wind, and road/traffic conditions, road-side service risk on proposed trip, crash risk times based on accident history, sun-in-eye, and driver, hours of service (HOS) optimization, and CSA score impact of on-road inspections.

In addition, system 100 may be configured to create contour maps of features of cylinders for a fleet of same model engines to illustrate how close or far the cylinders of the engine are from typical wear. Database 110 may provide examples of model engines in good condition so that the condition of the cylinders of a particular engine may be compared to model engine cylinders. To evaluate a condition of a particular engine, the model vehicle information may be specific to one customer or manufacturer or include all vehicle information in the database 110.

It will be appreciated that the aforementioned method, systems and devices may be modified to have some components and modules removed, or may have additional components and modules added, all of which are deemed to be within the spirit of the present disclosure. Even though the present disclosure has been described in detail with reference to specific embodiments, it will be appreciated that the various modification and changes can be made to these embodiments without departing from the scope of the present disclosure as set forth in the claims. The specification and the drawings are to be regarded as an illustrative thought instead of merely restrictive thought.

What is claimed is:

1. A system for analyzing an engine of a vehicle having an intake manifold, a crankcase and an exhaust, comprising:
a computer including a computer processor;

a plurality of removably attachable sensors including at least two of an exhaust sensor configured to be connected to the exhaust, an intake sensor configured to be connected to the intake manifold, and a crankcase sensor configured to be connected to the crankcase, the plurality of removably attachable sensors being configured to provide an engine signature to the computer;

a simulator module configured to utilize the computer processor to generate simulated signature features associated with a simulated vehicle having prescribed defects at a specified intensity for at least two of an intake stroke, a compression stroke, a power stroke and an exhaust stroke; and a self-learning module configured to utilize the computer processor to learn associations between the simulated signature features of the simulated vehicle and prescribed defects for each cylinder of the engine of the vehicle, wherein the computer processor is configured to compare the engine signature for each cylinder of the engine with the associations of the self-learning module to produce a probability indicator that the engine has the prescribed defect at the specified intensity, and display a diagnosis of the engine including a plot of a nominally expected prognosis relative to a current condition prognosis to provide a projected failure time or mileage for the engine according to the at least two of the exhaust sensor, intake sensor, and crankcase sensor.

2. The system of claim 1, wherein the exhaust sensor and the crankcase sensor are configured to simultaneously analyze multiple engine signatures to provide an engine assessment of the vehicle.

3. The system of claim 1, wherein the portion of the vehicle includes the engine.

4. The system of claim 1, wherein the portion of the vehicle includes a crankcase access port of the engine and the crankcase sensor is positioned relative to the crankcase access port.

5. The system of claim 4, wherein the crankcase access port includes an oil dipstick tube and the crankcase sensor is positioned relative to the oil dipstick tube.

6. The system of claim 1, wherein the portion of the vehicle includes an exhaust system of the vehicle and the exhaust sensor is positioned relative to the exhaust system.

7. The system of claim 1, wherein the engine signature includes a vibration signature from the exhaust sensor of an exhaust pipe and the crankcase sensor of a crankcase access port.

8. The system of claim 1, further comprising a user interface configured to display the engine signature.

9. A system for analyzing an engine of a vehicle, comprising:

a computer including a computer processor;

a plurality of removably attachable sensors connected to respective portions of the vehicle, the sensor being configured to provide an engine signature to the computer;

a database configured to store simulated signatures associated with a simulated vehicle having prescribed defects; and a self-learning module, with the computer processor, learns associations between the simulated signature of the simulated vehicle and prescribed defects according to the plurality of removably attachable sensors, wherein the computer processor is configured to compare the engine signature to the associations of the self-learning module to identify at least one prescribed defect associated with a diagnosis of the vehicle.

10. The system of claim 9, further comprising multiple sensors configured to simultaneously analyze multiple engine signatures to provide an engine assessment of the vehicle.

11. The system of claim 9, wherein the portion of the vehicle includes the engine.

12. The system of claim 9, wherein the portion of the vehicle includes a crankcase access port of the engine.

13. The system of claim 12, wherein the crankcase access port includes an oil dipstick tube.

14. The system of claim 9, wherein the portion of the vehicle includes an exhaust system of the vehicle.

15. The system of claim 9, wherein the engine signature includes a vibration signature.

16. The system of claim 9, further comprising a display configured to display the engine signature.

17. A method for analyzing an engine of a vehicle, comprising:

receiving, with a computer, an engine signature from a plurality of removably attachable sensors connected to respective portions of the vehicle;

generating, with a computer simulation program on the computer, a simulated signature of a simulated vehicle having prescribed defects;

associating, with a self-learning module on the computer, the simulated signatures of the simulated vehicle and the prescribed defects according to the plurality of removably attachable sensors; and comparing, with the computer, the vibration signatures and the simulated signatures to identify at least one prescribed defect associated with a diagnosis of the vehicle.

18. The system of claim 17, wherein the portion of the vehicle includes the engine.

19. The system of claim 17, wherein the portion of the vehicle includes a crankcase access port of the engine.

20. The system of claim 17, wherein the portion of the vehicle includes an exhaust system of the vehicle.

* * * * *